United States Patent [19]

Heck

[11] Patent Number: 4,484,699
[45] Date of Patent: Nov. 27, 1984

[54] TIRE CARRIER FOR PICKUPS AND VANS

[75] Inventor: Steven R. Heck, Luverne, Minn.

[73] Assignee: Luverne Truck Equipment, Inc., Luverne, Minn.

[21] Appl. No.: 521,535

[22] Filed: Aug. 9, 1983

[51] Int. Cl.³ .............................................. B60R 3/00
[52] U.S. Cl. .............................. 224/42.21; 224/42.06
[58] Field of Search ............... 224/42.21, 42.24, 42.28, 224/42.06; 414/463

[56] References Cited

U.S. PATENT DOCUMENTS

| 3,613,971 | 10/1971 | Betz | 224/42.21 |
| 3,698,609 | 10/1972 | Lund | 224/42.23 X |
| 4,140,255 | 2/1979 | Weiler | 224/42.21 X |
| 4,262,830 | 4/1981 | Haves | 224/42.21 X |
| 4,418,851 | 12/1983 | Ankeny | 224/42.21 X |

Primary Examiner—Steven M. Pollard

[57] ABSTRACT

A tire carrying device for carrying a spare tire on the outside of a van or pickup. Spring loading, uniquely placed, provides a compact means of providing easy lifting of the tire on an outside carrier, while at the same time allowing easy dropping of the tire to clear a tailgate or the like for access to the vehicle.

4 Claims, 4 Drawing Figures

TIRE CARRIER FOR PICKUPS AND VANS

BACKGROUND AND SUMMARY OF THE INVENTION

This invention pertains to devices for attaching spare tires to the exterior of a vehicle and more particularly to a spring-loaded mechanism adapted for easy use in raising the tire from ground level to carrying level.

Many vans, pickup trucks, and such vehicles as travel trailers use tires and wheel combinations which weigh enough as to be difficult for some people to lift. Frequently these vehicles especially those adapted for entrance or loading from the rear, store the tire within the vehicle, thus using up desirable interior space.

Spare tire carriers on those vehicles adapted to carry the tire and wheel outside of the vehicle, typically store the tire at the rear of the vehicle in a vertical position at a fairly high spacing from the ground. For a vehicle with a rear entrance, this storage interferes with access to the vehicle.

Former devices have used hinged carriers by means of which the tire generally is swung outwardly to clear the entrance. However, such construction requires mounting of the carrier on the body and the weight of the tire on the hinge tends to tear the hinge off from the vehicle. Also, the swinging mounting seems to be particularly subject to coming unfastened and swinging free, perhaps because of the non-rigid mounting.

By my device, I provide a hinged carrier adapted to swing down towards the ground where the tire will be out of the way of any access to the vehicle. The carrier can be readily dropped and returned to its upright position when the access means on the rear of the vehicle is to be closed. Normally, such a device would require a fairly large force to raise the tire and wheel from its lowered position which could cause severe problems for people subject to handicaps because of age, physical disability, heart disease or other physical weakness.

Spring loading uniquely positioned on my device provides a compact mode of further relieving the force required to raise the tire and wheel from the ground to the carrying position. Also, because of the bottom mounting, I am able to mount the tire carrier on the frame of the vehicle. Thus, the mount can be much more sturdy than a swinging carrier which would be bolted onto the body of the unit. There could be no tearing of any hinge mounting, and the latching of the carrier can be much more certain because of the solidity of the mounting.

FIGURES

DESCRIPTION

Briefly my invention comprises a tire holder having a moving carrier for the tire which is biassed to an upright position by a compression spring.

More specifically, my device is mounted on a bar 10 adapted to be bolted to the frame of a vehicle through flanges 11. Normally the frame members to which the flanges are bolted does not extend beyond the body of the vehicle and so, it becomes necessary to extend the carrying device to a point beyond the end of the body. This might be either at the front or the back of the vehicle, without in any way changing the construction. However, it is peculiarly adapted for those vehicles which have rear entrances or tailgates which might be blocked by an ordinary tire carrier.

In order to accomplish the extension, I provide an extension member 12 fixed to the bar 10. I have illustrated this member in an off-center position because in some cases, this might be desirable, as for example on the front of a van having a radiator in the center of the front or the rear of a van having a pair of rear doors where only one might be opened on some occasions, but where the second one, when opened would require that the tire be lowered. However, it is obvious that the transverse location of this bar is not a vital part of my invention. The bar 10 and extension member 12 together form a fixed frame attached to the vehicle.

Figure 1:
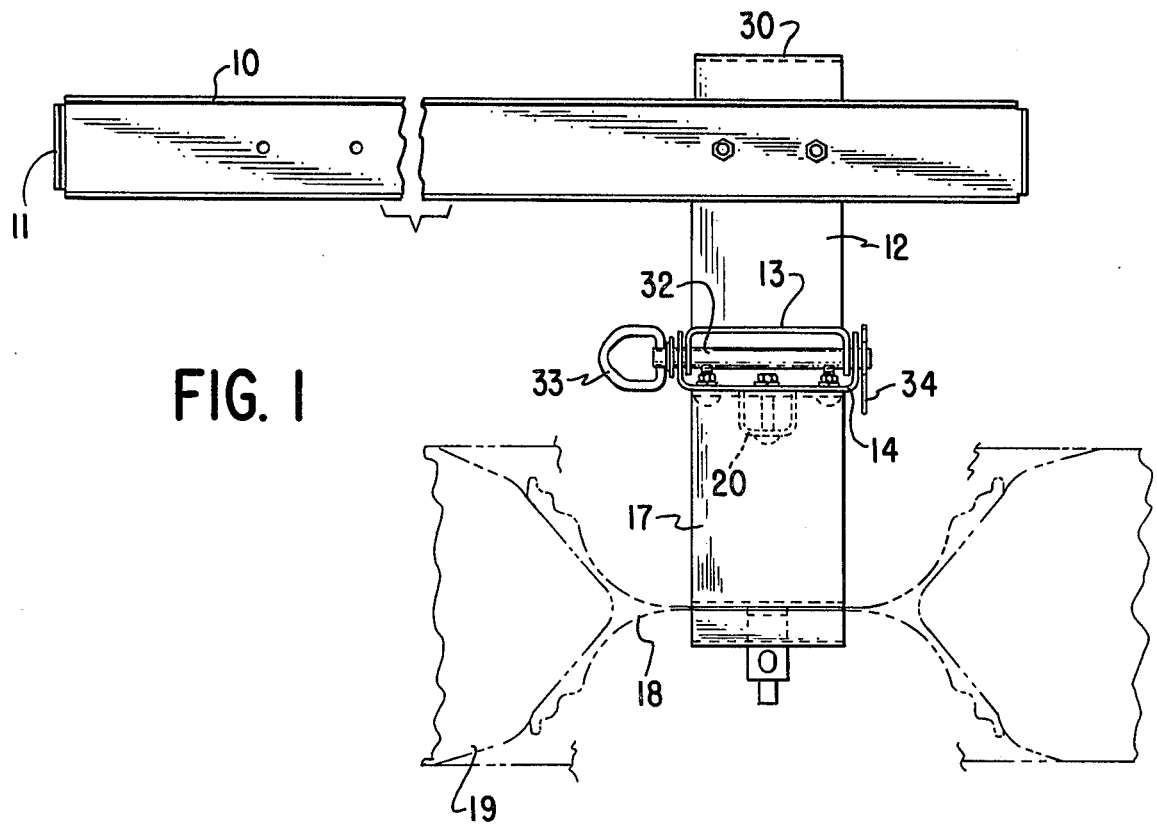
FIG. 1 is a top plan view of the device carrying the tire and wheel.
Figure 2:
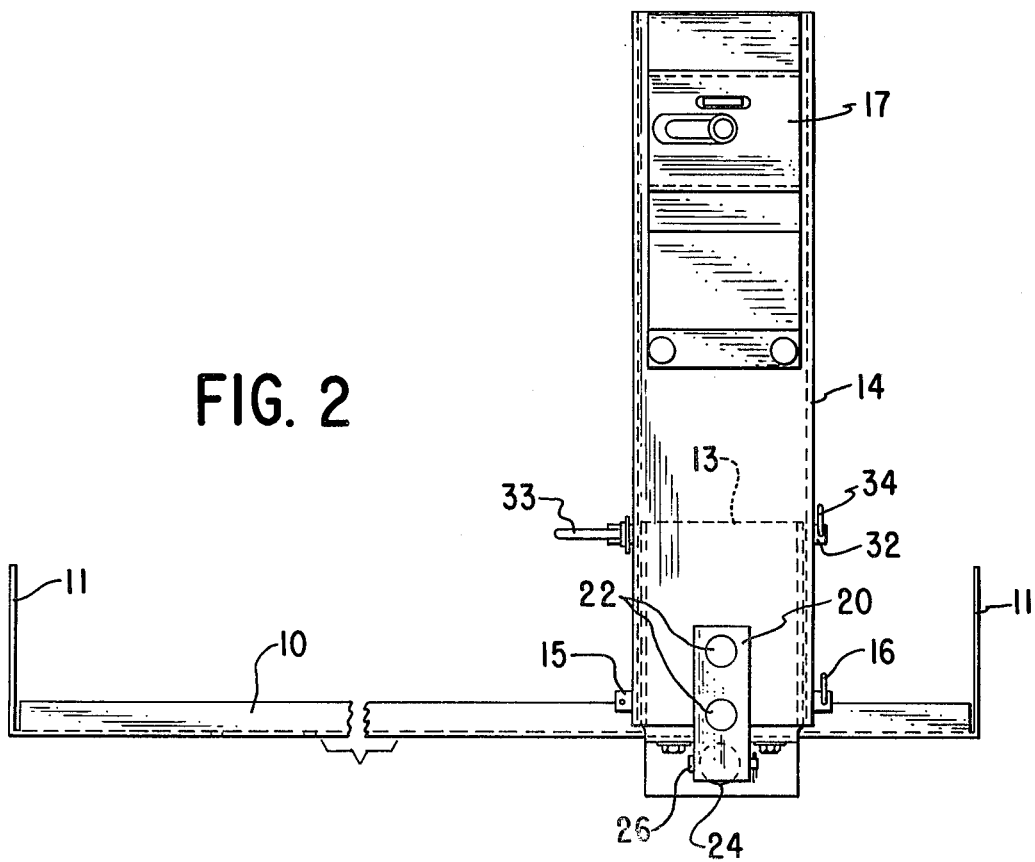
FIG. 2 is a rear elevational view of the device with the tire and wheel removed.

At the outer end of the member 12 I mount a channel-shaped bracket 13 on which is pivotally mounted the carrier arm 14. The pivoting device may be an axle 15 held in place by cotter key 16 or similar device. A carrier bracket 17 of any usual type is fixed to the arm 14 and is adapted to carry a wheel 18 and tire 19 (FIG. 1).

At the base of the arm 14 is an extension bracket 20 fixed to or fabricated as a part of the arm 14. I have shown it fastened in place by rivets 22, but many other types of fastening would work as well. This extension extends somewhat below the pivot so that some leverage is achieved by the biassing device. The length of the extension is completely dependent upon the design criteria used. If the device is for a fairly heavy tire and wheel, and if the coefficient of the spring is relatively weak, then the arm should be longer so that the lighter force on it will still provide sufficient lifting force on the tire.

The biassing means includes a compression spring 24 mounted on a holder rod 25 extending through the center of the spring. This rod is pivotally journalled on an axle 26 extending through the sides of the extension bracket 20 and through one end of the rod 25. Thus the rod can be pivotally moved relative to the bracket 20. A washer 28 slidable on the rod 25 and butted up against the axle 26 forms a base against which the spring 24 can seat.

Figure 3:
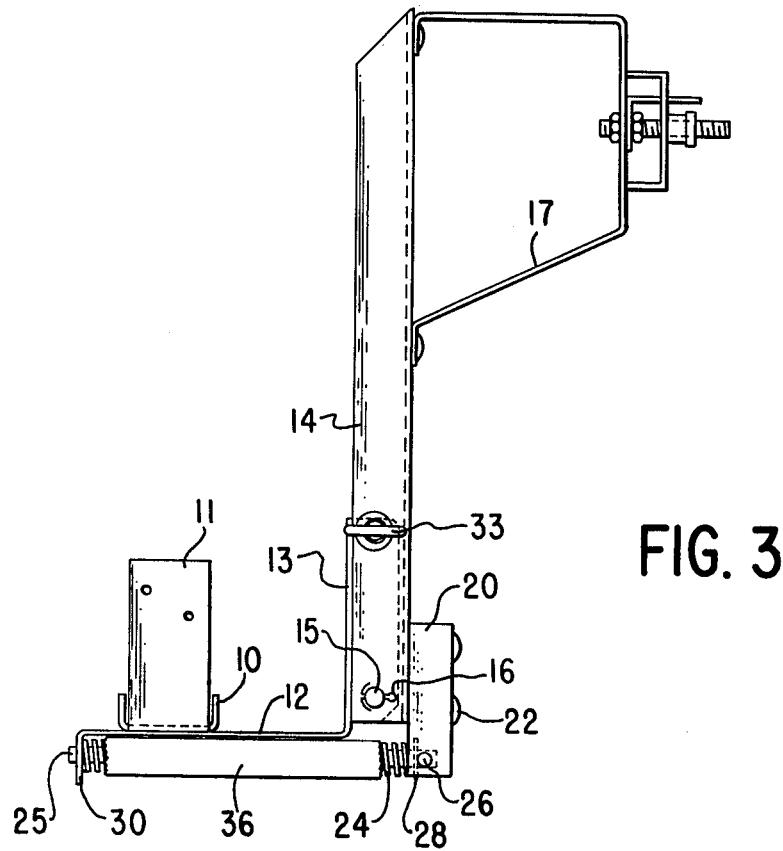
FIG. 3 is a side elevational view of the device as in FIG. 2 with the carrier arm in the upright position.
Figure 4:
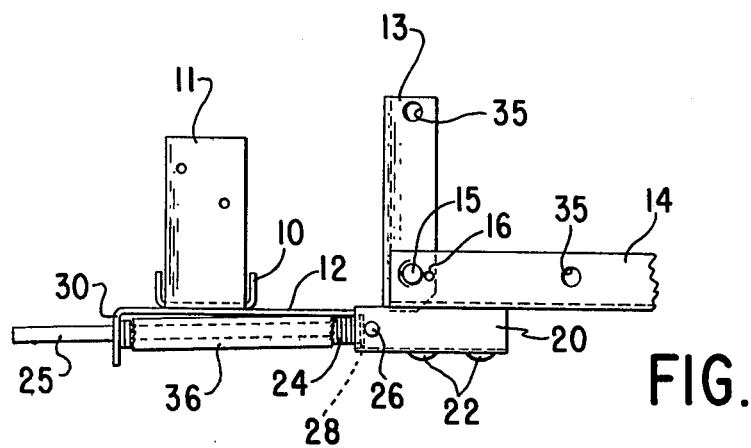
FIG. 4 is a partial side elevational view similar to FIG. 3 with the carrier arm in the lowered position.

The end of the rod 25 opposite its pivoted end extends through an opening in the closing end 30 of the extension member 12. The opening is large enough so that the rod will slide easily from the upright position shown in FIG. 3 to the lower position shown in FIG. 4 and in the return to the upright. The end of the spring 24 opposite the washer 28 also seats against the end 30. Thus movement from the upright position to the lower position, because of the location of the axle 15 above the centerline of the spring, is effective to compress the spring between the washer 28 and the end 30. The force caused by the compressed spring 28 acts to bias the carrier to its upright position. Thus, by proper choice of spring, the biassing force can be changed to allow for heavier or lighter tires.

The opertion of the device will be obvious from the foregoing description. It should be noted that as the carrier goes from its lowered position toward the upright position, the effective leverage arm of the spring is somewhat lengthened as the pivot axle 26 is carried through its arc of travel. Thus the greater pivotal movement from the force of the spring is developed as the tire is moved toward the upright position. This may be considered an advantage in most instances because most people using the device will be better able to lift the tire from its lower position somewhat, and less able to lift the tire at a higher level.

The carrier arm 14 can be locked in its upright position by a pin 32 which may have a head or loop 33 at one end and a removable pin 34 at the other end. The pin 32 extends through openings 35 in the arm 14 and the bracket 13; thus providing a positive holding for the arm in its upright position. In order to lower the carrier arm, this pin is pulled to allow motion of the arm.

In order to protect the spring 24 from dirt, water, and the like, I prefer to provide a cover 36 for the spring. I have found that a rubber tube similar to a bicycle inner tube works well as such cover.

Thus, I have provided a very convenient device for carrying a spare tire, and one which can be raised and lowered by about anyone without strain.

I claim:

1. Means for carrying a spare tire for a vehicle comprising fixed frame means attached to said vehicle including attachment means adapted to be attached to said vehicle, extension means fixed to said attachment means and extending beyond the exterior of said vehicle, carrier means pivotally connected to said extension means and being thereby pivotable between an upright and a lower position, said carrier means including a carrier arm adapted to receive and hold said tire and having a bracket at the lower end of said carrier arm when said arm is in its upright position, bar means pivotally connected to said bracket, said fixed means having a closing end, said bar means extending toward and being slidably journalled in an opening in said end, compression spring biassing means surrounding said bar and engaged between said bracket and said closing end whereby said spring may be compressed between said end and said bracket.

2. The device of claim 1 in which said spring is covered by rubber tube means.

3. The device of claim 1 in which the pivotal connection between the bar and the bracket is effected by an axle extending through said bar and said bracket, washer means on said bar abutting the axle, said spring being seated against said axle.

4. The device of claim 3 in which said extension means includes a supporting bracket means, said carrier arm being pivotally mounted on said supporting bracket means near its lower end, pin means engageable between said supporting bracket means and said carrier arm at a point remote from the pivotal mounting to hold said carrier arm in a fixed position relative to said fixed means, said pin means being removable to allow motion of said carrier arm.

* * * * *